UNITED STATES PATENT OFFICE.

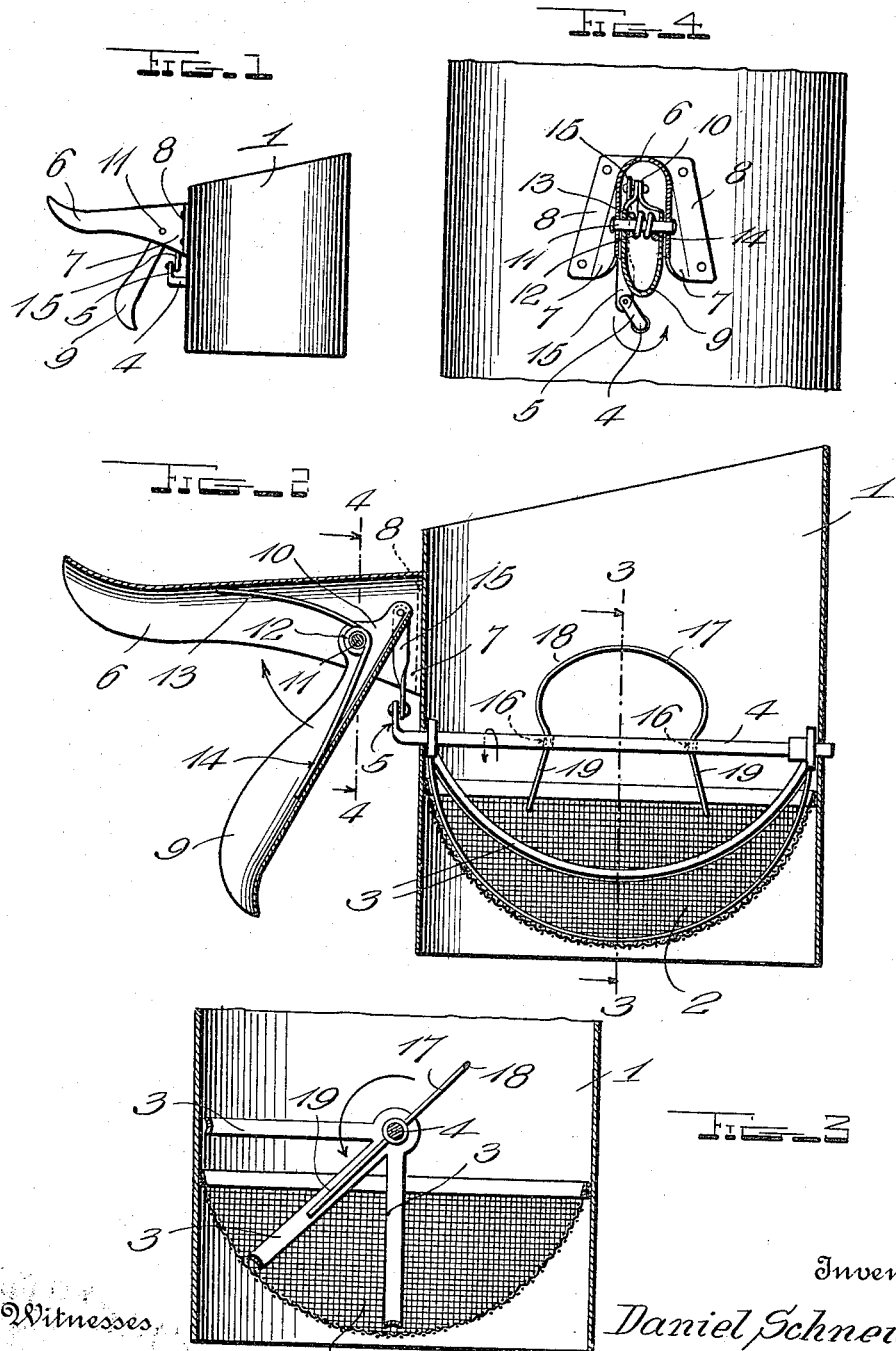

DANIEL SCHNEIDER, OF SPOKANE, WASHINGTON.

FLOUR-SIFTER.

1,188,840.  Specification of Letters Patent.  Patented June 27, 1916.

Application filed December 2, 1915. Serial No. 64,709.

*To all whom it may concern:*

Be it known that I, DANIEL SCHNEIDER, a citizen of the United States, residing at Spokane, in the county of Spokane and State of Washington, have invented certain new and useful Improvements in Flour-Sifters; and I do declare the following to be a full, clear, and exact description of the invention, such as will enable others skilled in the art to which it appertains to make and use the same.

This invention relates to improvements in devices for sifting flour, meal, and the like, of that class in which a suitable receptacle is provided with a screen at or near its lower part, and an oscillatory agitator passing over the face of the screen.

The object of the invention is to provide a device of this character which may be held and operated by one hand to permit the dough to be kneaded with the other.

A further object of this invention is to provide in a device of this character an additional agitator which stirs the body of the material in the receptacle at the same time the oscillatory agitator passes over the face of the screen.

A further object of the invention is to provide a device which is simple and durable in construction, inexpensive to manufacture, and one which will be very efficient in operation.

With this and numerous other objects in view, my invention consists of certain novel features of construction, combination and arrangement of parts which will be hereinafter referred to and more particularly pointed out in the specification and claim.

In the accompanying drawings: Figure 1 is a side elevation of my improved device reduced; Fig. 2 is a central vertical longitudinal section; Fig. 3 is a section taken on the line 3—3 of Fig. 2; and Fig. 4 is a section taken on the line 4—4 of Fig. 2.

In describing my invention, I shall refer to the drawings in which similar reference characters designate corresponding parts throughout the several views and in which the numeral 1 designates the body of the sifter which comprises a cylindrical member open at the top and bottom, and the numeral 2 designates the sieve which is constructed of any suitable wire mesh and is preferably hemispherical in shape. This sieve is attached to the receptacle in any desired or preferred manner. The beater or agitator 3 consists of a plurality of arcuate wire members spaced apart at their lower ends and connected by suitable hubs to a longitudinally extending shaft 4. This shaft 4 is adapted to bear within openings provided in diametrically opposite sides of the receptacle 1, and one of the ends of the shaft 4 projecting from the said receptacle has formed thereon an offset member designated by the numeral 5.

The numeral 6 designates an inverted substantially U-shaped laterally projecting handle for the receptacle, which has one end enlarged as shown at 7. Extending from the enlarged end 7 of the handle are flanges 8 which are secured by any preferred means to the side of the receptacle 1 and which hold the said handle 6 securely and rigidly attached thereto. Positioned below the rigidly secured handle 6 is an additional handle or operating lever 9 which is substantially U-shaped in cross section and has one of its ends 10 positioned in the enlarged end 7 of the rigidly secured handle. The end 10 of the operating lever 9 is contracted within the enlarged end of the rigidly secured handle 6 and adjacent said contracted end is positioned a pivot pin 11 which projects through the edges of both handles to form a hinge for the same. A two-arm spring 12 is positioned between the said handle and operating lever by having its body portion wrapped around the pivot pin 11, and the arms 13 and 14 to rest against the curved surfaces of the respective fixed handle and operating lever. Connected to the contracted end of the operating lever 9 is a twisted link 15, which engages at its opposite end the extremity of the offset 5 on the outer end of the agitator shaft 4, for a purpose to be hereinafter more fully set forth. The agitator shaft 4 which extends longitudinally through the receptacle 1 is provided with a pair of centrally spaced longitudinally extending elongated apertures 16. An additional agitating member 17 which is composed of a single piece of wire bent substantially U-shaped as shown at 18 and has outwardly projecting spring arms 19. To insert this additional agitating member, the spring arms 19 are contracted until they are adapted to be projected through the apertures 16 in the agitating shaft 4, and the same are inserted therethrough until the inner end of the spring arms 19 have been reached, whereby on account of the resiliency of said spring arms, the said member will be held securely across said shaft as is clearly shown in Fig. 2 of the drawings.

The additional agitating member will be securely held in the shaft by the fact that the inner ends of the spring arms 19 will be forced thereby tightly against the outer ends of the elongated openings or apertures 16 to accomplish the desired result.

In operating the device it will be noted that it is merely necessary for the operator to grasp the handle 6 and the operating lever 9, and by a pressure of the fingers toward the palm of the hand, the operating lever 9 will be swung toward the handle 6, thus oscillating the shaft 4 and causing the agitator 3 to sweep across the face of the sieve 2. As the pressure is released, it will be noted that the spring 12 will readily return the handle of the operating lever 9 to its initial position.

It will be furthermore noted that the additional agitating means 17 on the agitating shaft 4 will be oscillated upon the operation of the handles 6 and 9 as described in the above paragraph. This additional agitating member provides means in this device whereby the flour, meal or the like which is contained in the receptacle to be sifted, is stirred at the same time the oscillatory agitator passes over the face of the screen in the body of the receptacle. This operation prevents the flour, meal, etc., from caking or banking up in the said receptacle, and preventing the same from easily and readily dropping through the mesh in the sieve.

It will be noted that I have provided in this device a structure for carrying out the objects of this invention which is extremely simple and very efficient in operation. The enlarged end 7 of the rigidly projecting handle 6 on the side of the receptacle provides a shield or a hood for the essential exposed parts that operate this device.

The hood or shield formed by the enlarged end 7 of the rigid handle 6 forms a very important and essential part of my invention, as the protection afforded by the same for the operating parts of this device, prevents any of the said parts from becoming accidentally interfered with during the use and operation of the sifter. The inner end of the operating handle, and the major portion of the twisted link that is connected therewith as well as the operating spring, are always inclosed and protected by this enlarged end and there will be absolutely no danger of the same being interfered with during their operation. This forms a very compact and efficient means for operating a flour sifter of this character and also to afford the said means protection for its exposed movable parts.

It will furthermore be noted that the two-arm coiled spring in my device is entirely inclosed within the arm 6 and the operating lever 9, on account of the substantially U-shape construction of the said parts. This is obviously an advantage in devices of this character, as the said spring cannot in any manner become dislodged and thereby render the device inoperative. The additional agitating member in my device also has a further function inasmuch as it can be used as a handle in case the oscillatory agitator which passes over the screen or sieve 2 in the bottom of the receptacle should become in any manner wedged thereto; a person operating this device by simply grasping the member 17 can easily move the agitator, thereby allowing it to resume its normal operation.

From the above description of the construction of my improved device, the manner of applying the same to use and the operation thereof will be readily understood and it will be seen that I have provided a simple, inexpensive and very efficient means for carrying out the objects of this invention.

While I have particularly described the elements best adapted to perform the functions set forth, it is obvious that various changes of form and operation and in the minor details of construction may be resorted to, within the scope of the appended claims without departing from the spirit or sacrificing any of the principles of the invention.

I claim as my invention:

In combination with a receptacle having a reticulated bottom and an agitator for the same, operating means for said agitator, of a shaft for the agitator extending diametrically across said receptacle, said shaft having a pair of centrally spaced longitudinally extending elongated openings therethrough, an additional substantially U-shaped resilient wire agitator having straight spring arms projecting at an angle from its ends and adapted to be compressed to project through said elongated openings in the shaft, whereby the inner ends of said arms when released will spring against the outer ends of said elongated openings to hold the additional agitator in position.

In testimony whereof I have hereunto set my hand in presence of two subscribing witnesses.

DANIEL SCHNEIDER.

Witnesses:
G. B. DRESHER,
LUETTA D. BISBEE.

Copies of this patent may be obtained for five cents each, by addressing the "Commissioner of Patents, Washington, D. C."